S. J. TAYLOR.
Straw Cutter and Corn Sheller.
No. 34,533.
Patented Feb. 25, 1862.
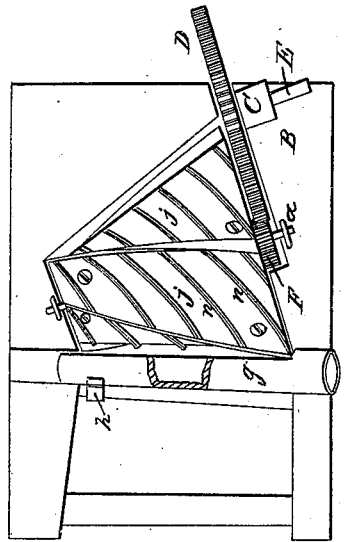
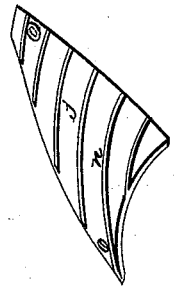
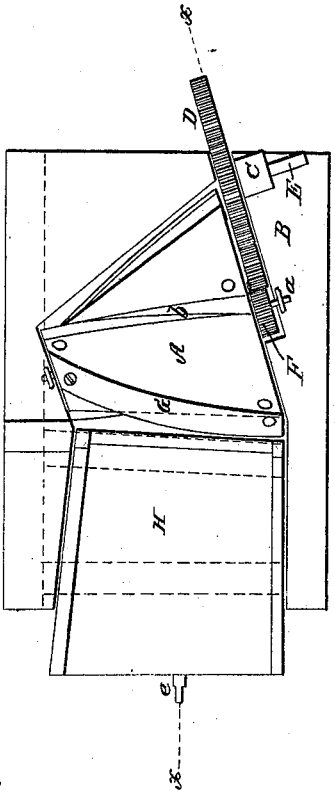
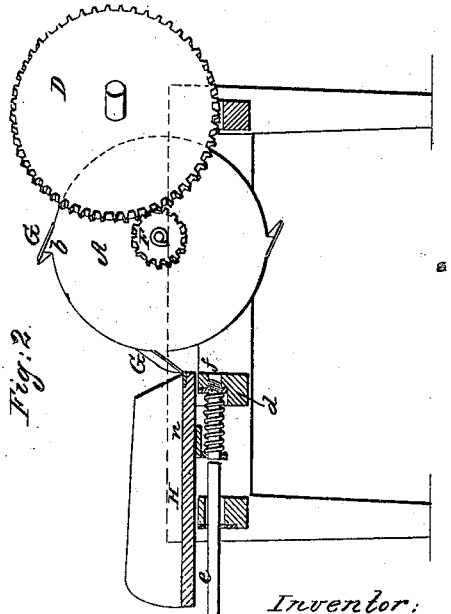
Witnesses:
Inventor:

UNITED STATES PATENT OFFICE.

S. J. TAYLOR, OF ROME, NEW YORK.

IMPROVED CONVERTIBLE STRAW-CUTTER AND CORN-SHELLER.

Specification forming part of Letters Patent No. 34,533, dated February 25, 1862.

*To all whom it may concern:*

Be it known that I, S. J. TAYLOR, of Rome, in the county of Oneida and State of New York, have invented a new and useful combination of Straw-Cutter and Corn-Sheller; and I do hereby declare that the following is a full, clear, and exact description of the same, reference being had to the accompanying drawings, making a part of this specification, in which—

Figure 1 is a plan of my improved machine adapted to use as a straw-cutter. Fig. 2 is a side elevation of the same, a portion being shown by a section taken in the line $x\ x$ of Fig 1. Fig. 3 is a plan of the machine adapted to use for shelling corn. Fig. 4 is a perspective view of one of the spirally-ribbed feed-plates.

Similar letters of reference indicate corresponding parts in the several figures.

The object of this invention is to so combine a straw-cutter and corn-sheller in one machine as to require but little, if any, more machinery for both than is usually required for either alone, the machine being adapted to work in either capacity and with equal efficiency by a simple substitution of some of its parts.

The invention consists, first, in the manner of arranging the knives on the drum so as to give a gradually increasing and shear-wise cut, in combination with the adjustable feed-box, to adapt the machine to cut hay and straw; and it consists, secondly, in the combination of the spirally-ribbed feed-plates with the drum-spiral ribs and inclined spout, to adapt the machine to use for shelling corn, as will be hereinafter fully explained.

To enable others skilled in the art to fully understand and construct my invention, I will proceed to describe it.

The frame in which the machinery is arranged and supported is constructed in rectangular form, of wood, put together in the usual manner, having side and end pieces mortised into and mounted upon legs. On top of this frame is a bed-piece B, which is cut out in the center to allow the machinery to work through it.

A is a drum, having the form of a conic frustum secured upon a horizontal shaft $o$, which is journaled at its ends in boxes so placed on the bed-piece as to bring the periphery of the drum parallel with the inner end of the feed-box. The drum A is armed with a series of spiral ribs $b$, which extend its entire length. These ribs have a radial surface in front and are chambered on their back sides to receive knives G, which are of spiral form and secured at their ends by screws. These knives project beyond the radial surface of the ribs, and as the drum is revolved act in concert with a metal plate attached to the inner end of the feed-box to cut the hay or straw placed therein and fed up to the knives by hand into suitable lengths for feed.

Motion is imparted to the drum A and knives G by means of the large spur-wheel D, secured on the end of the crank-axle E, meshing into and driving the pinion F, which is keyed on shaft $a$.

The crank-axle E is journaled in the box-bracket $c$, which is mortised at one end of the frame into the bed-piece.

The feed-box H is supported upon and moved in and out on the front end piece of the frame and cross-bar $d$ by a shaft $e$, which has a screw-thread cut on its inner end, which is fitted to work through a nut $f$ attached to the cross-bar $e$. A shoulder on the shaft $e$, working against a bracket $i$, pendent from the feed-box, serves to connect the box with the screw-shaft to adjust it up to the knives, while a spiral spring interposed between the nut and bracket and encompassing the screw portion of the shaft $e$, prevents the feed-box from being drawn in under the knives. The knives being secured upon the drum and the feed-box properly adjusted to them, the hay or straw is placed in the feed-box and fed up to the knives by one hand, while the drum, by means of the crank and intermediate gearing, is revolved by the other, imparting a high velocity to the drum and knives, which effects the cutting of the hay or straw fed to them in an easy and expeditious manner.

To adapt the machine to shell corn the feed-box H is drawn back out of the way by means of the screw-shaft $e$, and a spout $g$ placed across the bed-piece in front of the drum, as in Fig. 3, where it is secured at the largest end by a bolt passing through the flange on the under side and through the flange or projection on the bed-piece, and at the other end by a bracket $h$, attached by a screw-bolt to the cross-bar $d$. The knives G being now removed from the drum, spirally-ribbed feed-plates $j$, (shown detached in Fig. 4,) which may be made of cast or malleable iron, cast of the proper shape to fit the periphery of the drum, are placed on the drum between the ribs of the same and secured by one or more screws at each end. The machine being thus arranged, it is adapted to use for shelling corn. A high velocity of speed being given to the drum, in the manner before described, the ears of corn are fed point downward into the spout $g$, the spiral ribs $n$ on the plate feed or force the ears of corn toward the opposite end of the spout, while the ribs $b$ on the drum remove the kernels of corn from the cobs, the corn falling under the drum into a box, and the cobs escaping at the lower end of the inclined trough over the side of the machine.

The within-described combination of straw-cutter and corn-sheller is simple in its construction and operation, and having the same drum and actuating mechanism answers the double purpose of cutting straw and shelling corn, makes a great saving in the cost of the machinery usually required to effect the same result, besides occupying much less room and being easier of transportation.

Having thus described my invention, what I claim as new, and desire to secure by Letters Patent, is—

The bed-piece B, gear-wheel D, pinion F, spiral ribs $b$, and drum A, combined, arranged, and adapted for the attachment of the spirally-ribbed feed-plates $j$ or spiral knives G, all as and for the purposes substantially as described.

S. J. TAYLOR.

Witnesses:
CHAS. HEMMEN,
R. KEENEY.